(12) United States Patent
Champion

(10) Patent No.: US 6,817,634 B2
(45) Date of Patent: Nov. 16, 2004

(54) KNOT TYING DEVICE

(76) Inventor: Mark Champion, 9 Hansard Street, Zetland NSW 2015 (AU)

( * ) Notice: Subject to any disclaimer, the term of this patent is extended or adjusted under 35 U.S.C. 154(b) by 0 days.

(21) Appl. No.: 10/658,817

(22) Filed: Sep. 8, 2003

(65) Prior Publication Data

US 2004/0130155 A1 Jul. 8, 2004

(30) Foreign Application Priority Data

Sep. 6, 2002 (AU) .................................. 2002951276

(51) Int. Cl.[7] .................................................. D03J 3/00
(52) U.S. Cl. ........................ 289/17; 289/18.1; 289/1.5
(58) Field of Search ........................... 289/1.2, 1.5, 17, 289/18.1; 7/106, 158; 43/1, 4, 43.16; 606/148, 144, 150, 139, 210, 211, 205

(56) References Cited

U.S. PATENT DOCUMENTS

| | | | | |
|---|---|---|---|---|
| 3,782,764 A | * | 1/1974 | Browning | 289/17 |
| 3,837,691 A | * | 9/1974 | Smythe | 289/17 |
| 4,403,797 A | * | 9/1983 | Ragland, Jr. | 289/17 |
| 5,240,295 A | * | 8/1993 | Spencer | 289/1.5 |
| 5,690,370 A | * | 11/1997 | Steck, III | 289/17 |
| 5,971,447 A | * | 10/1999 | Steck, III | 289/17 |
| 6,026,607 A | * | 2/2000 | Bukowski | 43/4 |
| 6,185,858 B1 | * | 2/2001 | Choron | 43/44.83 |
| 6,322,112 B1 | * | 11/2001 | Duncan | 289/1.5 |

* cited by examiner

Primary Examiner—Gary L. Welch
(74) Attorney, Agent, or Firm—Akin Gump Strauss Hauer & Feld, L.L.P.

(57) ABSTRACT

A device is provided for forming a knot in a fishing line or the like in order to attach a fish hook or other item of fishing tackle thereto or to join the line to another line. The device 131 has support means 132 with three fingers or other suitable nodes 133, 134 and 135 extending therefrom in spaced relationship. The middle or second finger or node 134 is offset from a line joining the first and third fingers or nodes 133,135, each finger or node having means associated therewith which cooperate to allow the tying of a hangman's knot or uni-knot. The first finger or node 133 has means 139 to retain and rotate the free end of the line after it has passed around the other two fingers or nodes so as to be able to twist the free end 164 of the line about both a first primary portion 137 of the line and a second return portion of the line 163 to form the knot. The third finger or node 135 allows a loop to be formed in the primary line to create the said return portion, and the second finger or node 134 allows a loop 147 to be formed in the line intermediate the return portion 163 and the free end of the line 164. The second finger or node 134 keeps said loop thus formed away from or clear of the twisting operation performed by the rotation means 139 twisting the free end 164 about the primary and return portions of line 137,163 running between the first and third fingers or nodes 133,135.

22 Claims, 13 Drawing Sheets

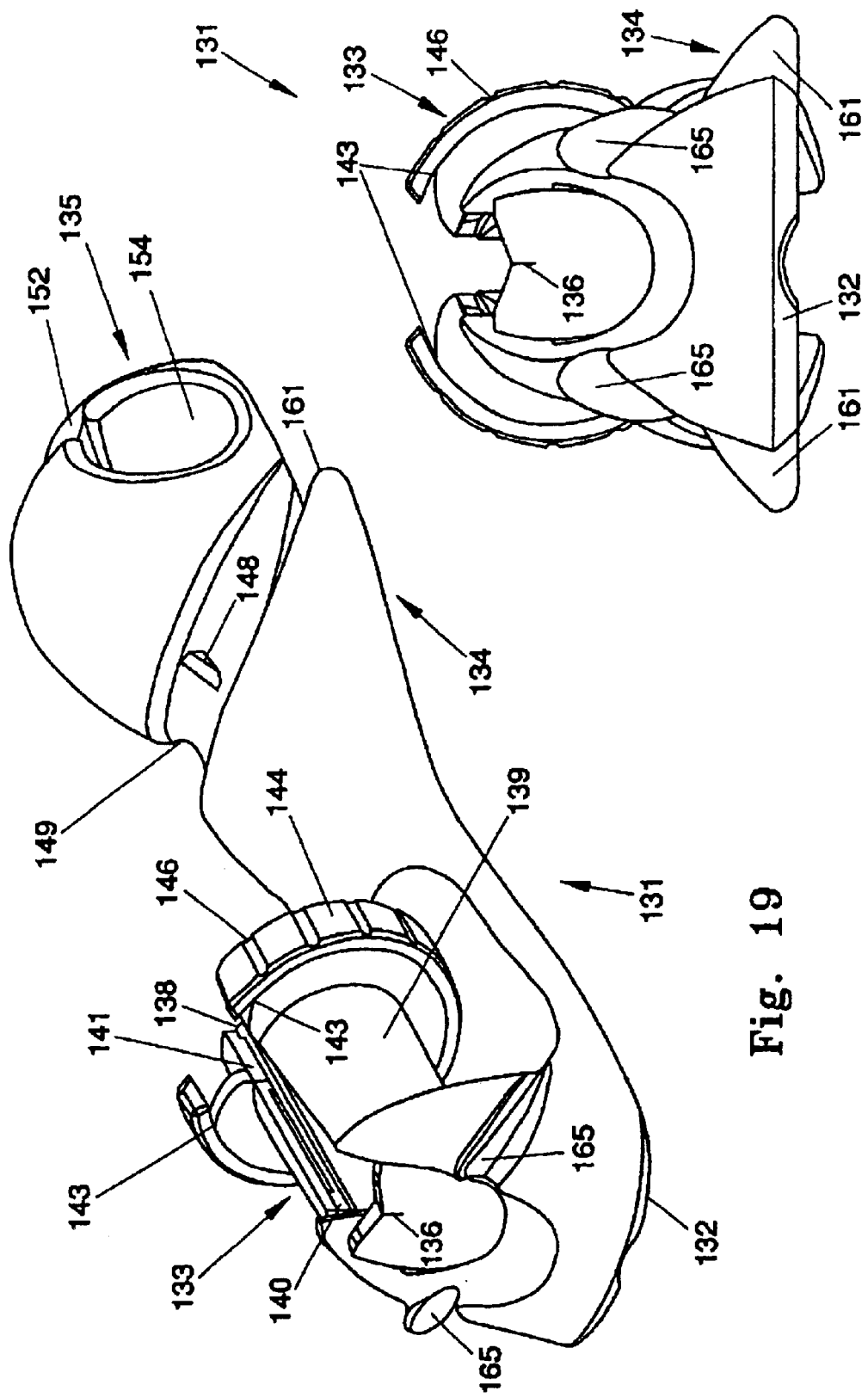

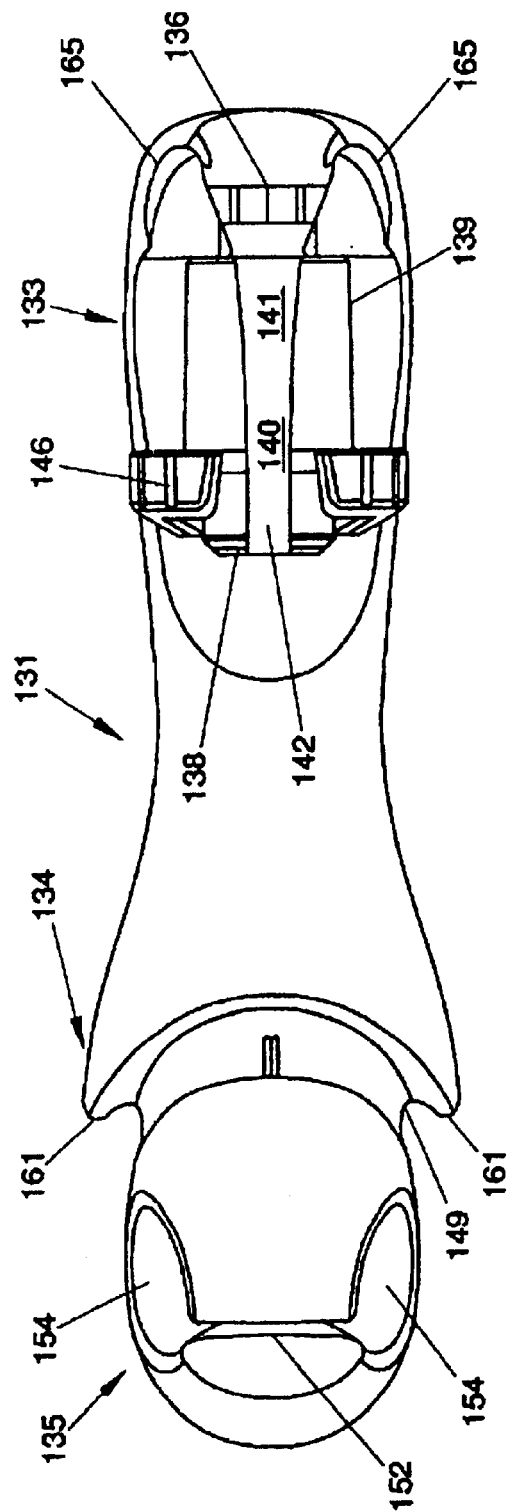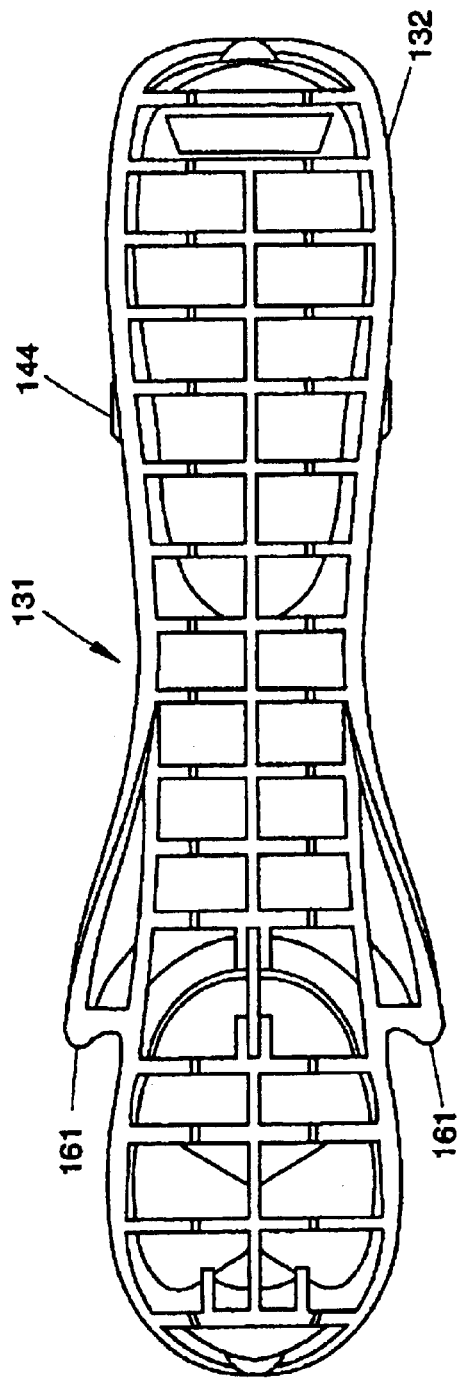

KNOT TYING DEVICE

BACKGROUND OF THE INVENTION

This invention relates to a device or apparatus for tying knots and in particular to a device for tying a knot in a fishing line so as to attach a hook or lure or the like to the fishing line.

Although the following description refers primarily to the tying of hooks or lures to a fishing line, no such limitation is intended thereby, and any adaptation of the invention whereby a knot may be formed in a line or rope or the like for the purpose of tying an item thereto, especially when that item has an eye through which the line or rope is fed to form the knot, is also meant to be included.

Although a substantial number of knots may be used when tying a hook or lure to a fishing line, it is well known that a number of available knots will substantially diminish the breaking strain of the line. In addition, a number of knots have a tendency to slip, especially when it is appreciated that they are used with fishing line which is generally nylon and consequently itself a fairly slippery material. These factors of course are extremely important, as failure of the line caused by breaking or loss of the fishing rig because a knot has slipped will mean that the fishing tackle including hook and bait etc will have been lost and worse still the fish will have gotten away.

On the other hand, it has been established that certain types of knots, particularly those which involve the application of a number of turns or twists to either one or both of the two parts of the line which form the knot (ie after the line has been fed though the eye), may be less likely to cause such a reduction in the breaking strain of the line. However, not all knots which involve twists will be useful as some of these have been found to have a tendency to slip, and/or still cause a reduction in the breaking strain, by virtue of the geometry of the knot.

Thus some knots such as the so called "half-blood" knot, whilst not diminishing the breaking strain of the line, may be prone to slip. One improved form of knot however which is based on the half-blood knot and which helps obviate some slippage is known as a clinch knot. In this particular knot, the line is passed through the eye of the hook or swivel of a lure and doubles back upon itself at which point the free end is wound five or so turns around the main line and away from the eye. The end of the line is then looped back (forming a large loop) and passed through the first loop nearest the hook or swivel in the same initial formation as the half-blood knot, except that it is then again passed through the large loop thus formed. The knot is then drawn into shape and the coils thus formed are slid down against the eye to tighten the knot. Although this knot is less likely to slip than some other knots including the half blood knot, there is a tendency for this arrangement to diminish the breaking strain of the line because the primary line itself becomes twisted in the process of forming and tightening the knot. (This knot is illustrated in the accompanying figures and described in detail later in this specification.) Furthermore, in the clinch knot just referred to, the free end of the line tends to point in the direction of the hook which may be a disadvantage in certain fishing applications.

A somewhat similar knot, but with further improved properties, is the so called hangman's knot or uni-knot. In this variation, the line is run through the eye of the hook or swivel (for at least 15 centimetres or so) and folded back to make two parallel lines. The free end of the line is then drawn back in a circle towards the hook or lure. After making five or six turns with the free end around the double line, the free end is then inserted through the circle previously formed and whilst holding the double line at a point where it passes through the eye, the free end is pulled to "snug up" or compress the turns. The knot is then slid up towards the eye of the hook by pulling on the "standing" or primary line until the knot is tight. The free end is then trimmed flush as required. Because of the structure of the hangman's knot, the primary line itself is not twisted and hence there is no substantive reduction in the breaking strain of the line. Furthermore, the hangman's knot or uni-knot ought not slip. With advantage, the free end of the line is also pointing away from the hook, which is generally much more desirable.

Unfortunately, as would be expected, such knots which involve a number of twists require a greater degree of dexterity and as a consequence, many fishermen especially when fishing in the dark or in poor light conditions, will make do by tying a simpler and more conventional knot including, for example, even a simple granny or reef knot, both of which are prone to reduce the breaking strength of the line or slip badly, particularly in the case of the granny knot.

Whilst there have been several attempts in the prior art to provide devices for tying knots of one form or another, including the aforementioned clinch knot, there are however, no known devices capable of tying the hangman's knot or uni-knot.

It would therefore be extremely advantageous if there were a device suitable for tying a hangman's or uni-knot for use in attaching a hook or lure or other fishing tackle to a fishing line. It would also be advantageous if such a device were able to be fitted to the fishing rod to avoid having to hold an additional device, although a hand held device would also be advantageous.

BRIEF SUMMARY OF THE INVENTION

In an effort to ameliorate some or all of the foregoing disadvantages presented by less useful knots, especially in so far as the prior art devices do not address the problem of tying a hangman's knot or uni-knot, the present invention has therefore been conceived out of the need to provide a device for tying a knot, especially a hangman's knot or uni-knot in a fishing line whereby a hook, lure or other item of fishing tackle may be affixed to the line whilst maintaining as far as possible the breaking strength of the line and producing a knot which avoids slippage.

At the very least the invention provides an alternate device for tying knots, especially for tying the hangman's knot or uni-knot, than has hitherto been available.

According to the present invention there is provided a device for forming a knot in a fishing line or the like in order to attach a fish hook or other item of fishing tackle thereto or to join the line to another line, comprising a support means with three fingers or other suitable nodes extending therefrom in spaced relationship, so that the middle or second finger or node is offset from a line joining the first and third fingers or nodes, each finger or node having means associated therewith which cooperate to allow the tying of a hangman's knot or uni-knot as defined herein, the first finger or node having means to retain and rotate the free end of the line after it has passed around the other two fingers or nodes so as to be able to twist the free end of the line about both a first primary portion of the line and a second return portion of the line to form the knot, the third finger or node allowing a loop to be formed in the primary line to create the said return portion, and the second finger or node allowing a loop to be formed in the line intermediate the return portion and the free end of the line, the second finger or node keeping said loop thus formed away from or clear of the twisting operation performed by the rotation means twisting the free end about the primary and return portions of line running between the first and third fingers or nodes.

The offset of the second finger or node thus allows for the separation of the source line (ie the primary line) from the tail (end of the line) whilst twisting the spool to form the knot.

Preferably the support means is in the form of a plate or wire member which is removably attachable to a suitable portion of a fishing rod, although permanent fixing may also be appropriate. The means of removable attachment includes clasp mount, snap-on fitting, tape, wrap, Velcro™ fitting or tying, whilst permanent attachment includes gluing, riveting or fixing with screws. Alternatively the device may be hand held. The device may be constructed from any useful material, although in the case of a wire member arrangement, metals would be the preferred option, whereas in other instances, plastics may be the preferred choice.

Each of the three fingers or nodes may be integrally formed with the support means, for example during a moulding operation (especially in the case of plastics materials) or may be affixed thereto by suitable means. In another embodiment, the support means and fingers or nodes are formed from a continuous length of heavy gauge wire material bent to form the basic structure, ie providing the support means and respective fingers or nodes; the means associated with each finger for forming the knot being affixed to the respective fingers or nodes thus formed.

Preferably, one or more of the three fingers or nodes has grooves or serrations along a portion thereof to prevent slippage of the fishing line therefrom when the device is being used to form the knot. Alternatively, the shape of the respective finger or node itself may chosen so as to prevent slippage.

Preferably, the first finger or node has means associated therewith to retain the fishing line whilst forming the knot, so that the line is kept under suitable tension as it is fed through or around the various fingers or nodes and/or the components found thereon. The fingers or nodes, in combination, whether directly themselves or by virtue of the components attached thereto, thus hold the line in position, as the line is tensioned and the knot is formed.

The means to rotate the free end of the line about the primary and return portions of the line is preferably provided in the form of a rotatable spool arrangement having a central hollow core, the spool having a slot along the side thereof communicating with the hollow core to allow the primary and return portions of the line to be fed or threaded into the hollow core. The spool is preferably located on and rotatable about a spindle arrangement, the spindle itself also having a corresponding hollow core and having a similar slot along its length, whereby in a first feeding position, the slots in the spool and spindle are brought into alignment and the primary and return portions of the fishing line are fed through both slots and thus into the central core. In this way, the primary and return portions of the fishing line are retained in position, whilst the spool is twisted thereabouts, thereby causing the free end of the line to be wound the necessary number of turns (eg five or six turns) about the primary and return portions of the line.

Thus the rotating spool is a tubular shaped structure and its function is to wrap the tail or end of a line around the source lines without twisting them. The spool has an opening along its length to allow line to be fed through its centre prior to forming the knot, then removed, once the knot has been formed.

With advantage, the outer profile of the spool may be serrated, textured or shaped to allow the user to run a finger along the outer edge thereof to turn it as required.

A raised section, e.g., flange, on the outer edge of the spindle may mate with a notch in the spool as required so as to correctly aligning the twisting spool, in order that the line may be readily inserted & released from the spool/spindle combination. A lip or radially extending flange may run around the lower edge of the spindle, to hold the spool in place.

The means to retain the free end of the line in or on the spool, are preferably provided for example in the form of a simple cut in the periphery thereof analogous to the cut provided in a reel of sewing thread, into which the line can be wedged, so that the free end of the line will be retained therein and be caused to wind about the primary and return portions of the line passing through the centre of the spool/spindle combination, when the spool is turned about its axis.

Preferably, the third finger or node also has a hook threading means associated therewith for retaining a hook, especially the eye thereof, in position in order to allow for threading of the line therethrough. One particularly suitable arrangement is provided in the form of a slot in the third finger or node, comprising a funnel shaped entry point communicating with a hollow spigot onto which the eye of a hook is located. The fishing line is then threaded through the eye of the hook during the operation of forming the knot, whilst the slot itself allows removal of the line and hook once the knot is formed.

In a preferred embodiment, the lower or third finger or node houses a funnel shaped line threader and where desired an optional hook holder. The threader consists of two counter sunk style holes formed on opposite surfaces thereof that allow the line to be threaded through the finger or node. A slit extends from the centre of these funnel shaped holes to the outer edge of the finger or node, to allow the threaded line to be released from the device, once the line has been threaded through the eye of the hook and the knot is formed.

One, or both, of the counter sunk holes in the threader may contain curved shaped alignment grooves or notches that allow a hook to be held in place for threading.

Preferably the device also incorporates a line cutter, e.g. a simple blade arrangement, located in a suitable safe position, whereby the line and especially the free end of the line, may be trimmed, once the knot is formed. For example, a cutter may be mounted on the second finger or node or that vicinity, within a recessed groove, located towards its outer edge. The line may be drawn down into the blade for trimming, whilst the recess protects the blade and avoids accidental damage to the blade, injury or snagging of the line.

With advantage, the device may also incorporate not only means by which it can be attached to a single rod, but by suitable adaptation additional means so that it doubles as a device to retain sections of rod when disassembled. Thus, for example, in one embodiment, the fingers may have one or more clamping devices (adjacent to some or all of them, or formed by them in combination) each having a shape that allows a section of a fishing rod to be held parallel another section of a rod. This will hold a disassembled rod together & help protect the eyelets from damage during transport.

With advantage, one particular embodiment of the invention provides a symmetrical arrangement of fingers or nodes whereby the device can function either in right-handed or left handed mode. The device in general however need not be symmetrical.

The invention also provides a method of forming a hangman's knot or uni-knot as defined herein, utilising a device as described herein, the steps including:

a) threading a fishing line through a retaining means associated with the first finger or node to maintain tension in the line whilst tying the knot, b) feeding line through the hollow core of a spool and spindle combination mounted on the first finger or node of said device, then c) passing the line through a threading means located in a third finger or node located below the first finger or node, a hook having been located therein, so that the line is threaded through the eye thereof, or simply around the outside of the third finger or node if threading is not required, d) feeding the line back through the hollow core of the spool and spindle combination mounted on the first finger or node to form a return portion of the line, then e) winding the free end of line about a second finger or node intermediate the first and third fingers or nodes, the second finger or node being offset from a line drawn between the first and third fingers or nodes to ensure that the loop thus formed is kept clear of the turning device and the primary and return portions of line extending between the first and third fingers or nodes, f) attaching the free end of the line to the spindle by suitable attachment means, g) causing the spindle to be rotated a sufficient number of turns (e.g., five or six turns) as required to form the knot, ie winding the free end of the line that many turns about the primary and return portions of the line, then h) slipping the formed knot off the device and pulling on the respective portions of the line (ie the primary portion and the free end) to compact the knot, and then i) sliding the knot towards the eye of the hook to complete the operation.

Thus, the invention provides an integrated portable device, either hand held or for attachment to a fishing rod or other suitable object such as a tackle box, bait holder attached to belt etc, primarily suitable for forming a hangman's knot or uni-knot, including the facility to not only form the knot but also optionally including threading the hook, cutting/trimming the line and optionally providing a useful means to keep the rod segments together when disassembled. It will also be appreciated that other simpler knots may be formed with device, as required. For example a clinch knot may be formed by simply leaving out the additional turn around the second or middle finger or node. Furthermore, it will also be understood that the device may be used not only to attach an object to a line but one line to another, for example by forming a loop in a first line (analogous to the eye of a hook) and then repeating the process in a second line during which that line is fed through the previously formed loop of the first line, thus forming a double hangman's knot.

The advantages of using the device may be summarised as follows:

Method of forming and securing a knot to fix line or similar to object or other line No prior knowledge or expertise assumed (novice, or infrequent fishermen)

Reduces complexity of attaching line to objects, or other line

Maintains tension during forming of the knot (fishing line is resilient with limited memory)

Holds low friction lines whilst tying

Suits all gauges of line

Doesn't twist the source line whilst forming knot (this greatly affects strength)

Less finger dexterity required (older, younger, less supple fingers, unsteady hands, less feeling required, e.g.: cold climate, in gloves)

Useful in hostile environment (rocking boat, standing in water, or on rocky ground)

Wraps line mechanically into knot shape

Line threader may be included, which is helpful in bad light, imperfect eyesight, transparent or thin material (line), unsteady hands, narrow eyelets Line cutter can be incorporated—trim surplus line, more discrete knot, cutting line Formed knot slides off device Compact, simple, portable, flexible Integrated system for threading, tying and cutting Knots (fishing line, rope, cord, thread or similar) into a hook, swivel, lure, float, line or other attachment Line to lure (or other) rigging system Holds tail (free) end of line taught whilst tying Twists are formed without releasing line Easily affixed to a surface (or handle) and held May only require one free hand to form knot Simple construction Quickly and easily forms knot Secures the free end of a line to an attachment Self tightening knot Non slip knot Small (discrete knot) close to attachment Tail held against source line Tail runs away from attachment Small, portable, economical apparatus Optionally holds two piece rods together (when disassembled) to protect smaller eyelets The problems overcome by the device according to the invention, include:

Incorrect knot may substantially weaken line, slip or fail

Dexterity and knowledge required to form knot

Synthetic fishing line is difficult to see and work with

Line will not stay positioned unless tensioned

Some knots slip, cut themselves or unwind under pressure

Delicate/intricate task, particularly in unsympathetic conditions

Knot failure under heavy load

Time consuming to tie (when fish biting)

Complicated function to correctly learn and form knots.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 19 is an alternate perspective view of the device of FIG. 18, FIG. 20 is a top elevation of the device of FIG. 18, FIG. 23 is a front elevation of the device of FIG. 18, and FIG. 24 is a rear elevation of the device of FIG. 18.

DETAILED DESCRIPTION OF THE INVENTION

Figure 1A:
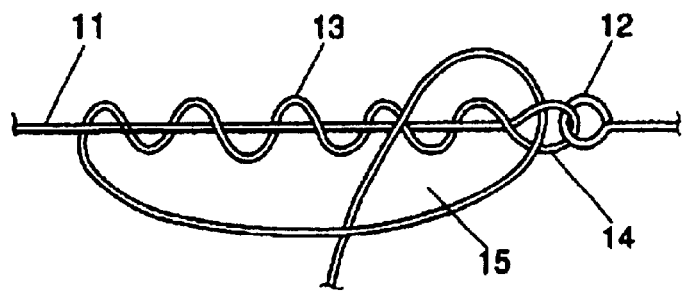
FIGS. 1a/b is a perspective schematic view of a clinch knot.
Figure 1B:
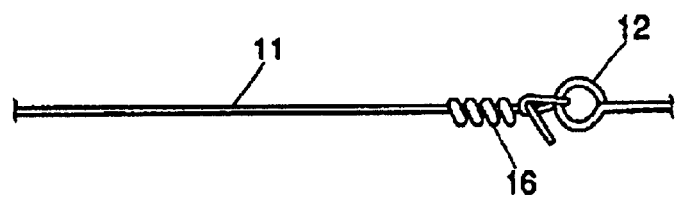

FIGS. 1a and 1b shows bow a clinch knot is tied. The primary line 11 is passed through the eye 12 of a hook or swivel and doubled back upon itself making five turns 13 around the line 11. The end of the line 11 is then passed through the first loop 14, above the eye 12, and then drawn through the large loop 15. The knot 16 is then drawn into shape and the coils thereof slid down tight against the eye 12, as shown in FIG. 1b. This knot however is likely to reduce the breaking strain of the line and is likely to slip.

Figure 2A:
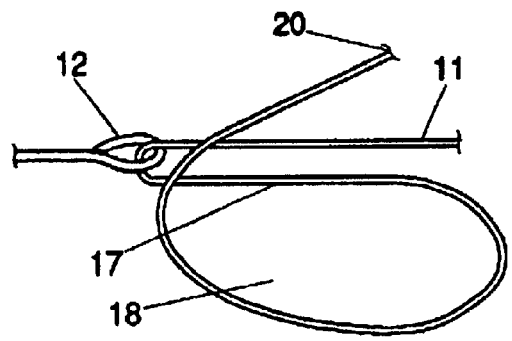
FIGS. 2a/d is a schematic view of a uni-knot or hangman's knot.
Figure 2B:
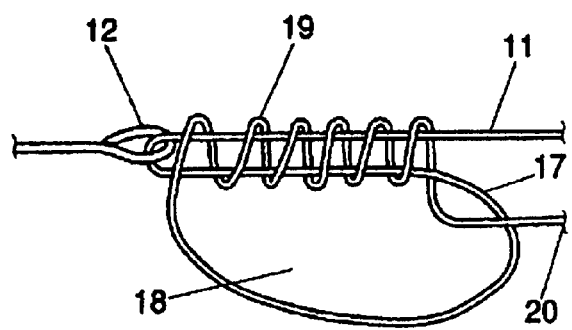
Figure 2C:
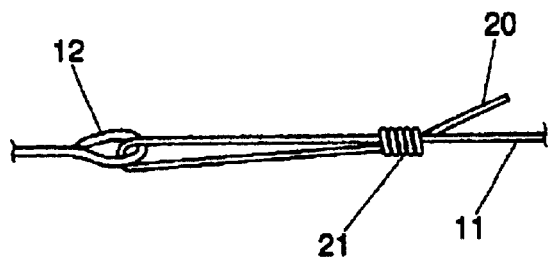
Figure 2D:
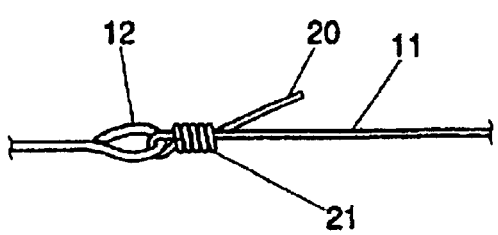

A more useful knot as discussed above is the uni-knot or hangman's knot, the construction of which is shown in FIGS. 2a to 2d. The line 11 in this case is passed through the eye of the hook 12 for at least 15 centimetres or so and folded back upon itself to form a return portion 17, thereby making two parallel lines. The end of the line 20 is then brought back towards the eye 12 of the hook to form a circle 18 as shown in FIG. 2a. As shown in FIG. 2b six turns 19 (in this case) are made around the pair of lines 11,17 and through the circle 18. Both lines 11,17 are then held at about a point where they pass through the eye 12 and by pulling on the free end of the line 20 the turns 19 are compacted, to obtain the result shown in FIG. 2c. The primary line 11 is then pulled to slide the knot 21 thus formed up against the eye 12. By continuing to pull on the line 11, the knot 21 is drawn up to the eye 12 as shown in FIG. 2d, whereupon the free end 20 may be trimmed. This knot is less likely to significantly affect the breaking strain of the line and is less likely to slip.

Figure 5:
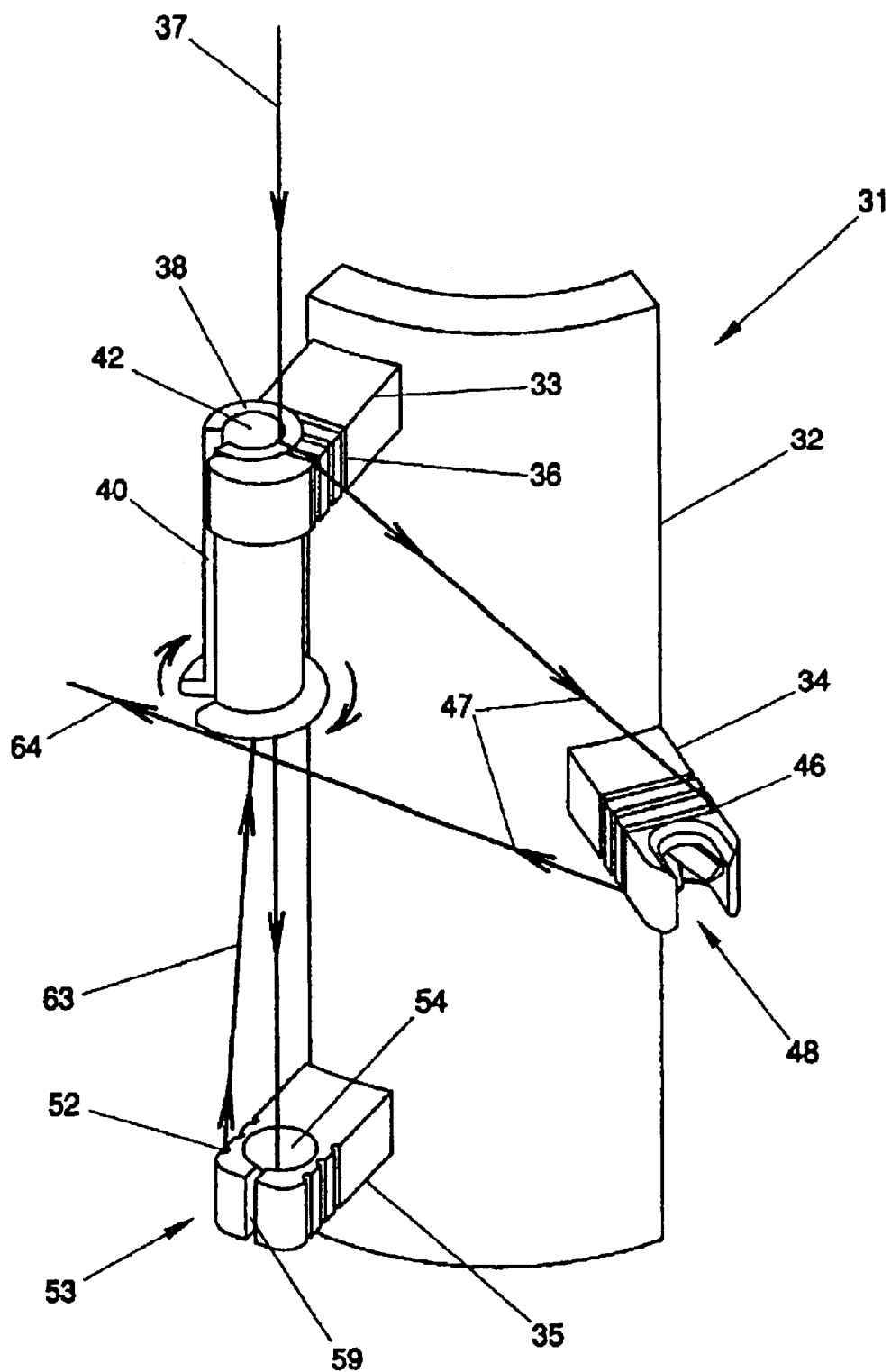
FIG. 5 is a perspective view of a further embodiment of a knot tying device showing the path of feeding a length fishing line to form a knot.
Figure 6:
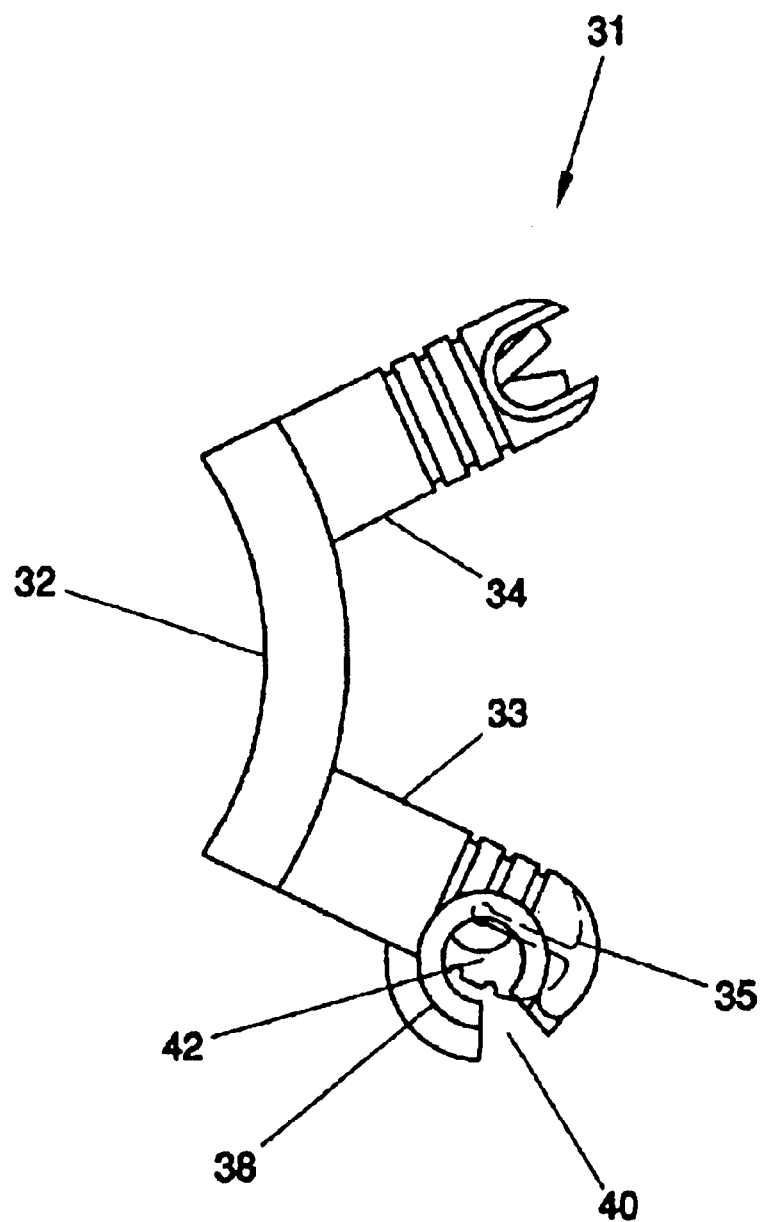
FIG. 6 is a plan view of one embodiment of the invention, with the spool removed.
Figure 7:
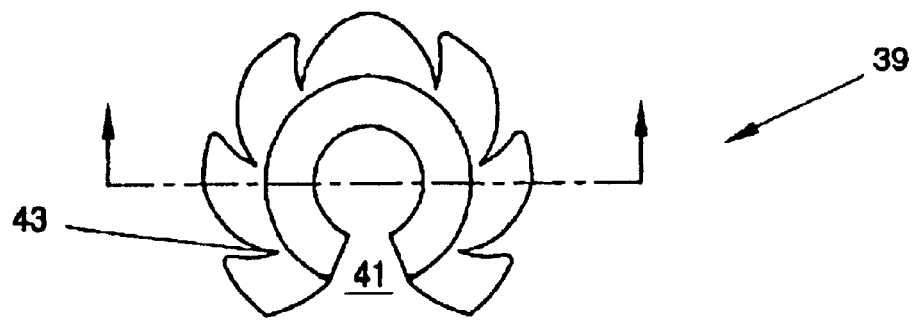
FIG. 7 is a plan view of a spool for use with various embodiments of the invention.
Figure 8:
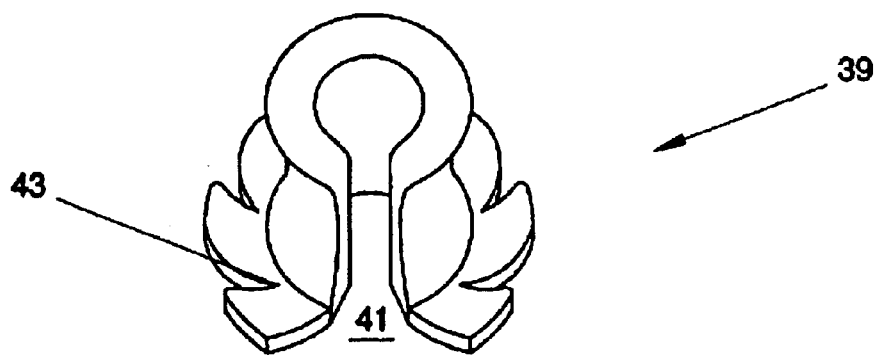
FIG. 8 is a perspective of the spool shown in FIG. 7.
Figure 9:
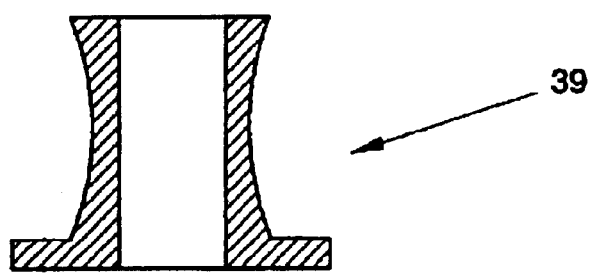
FIG. 9 is a cross-section through the spool of FIGS. 7 and 8.
Figure 10:
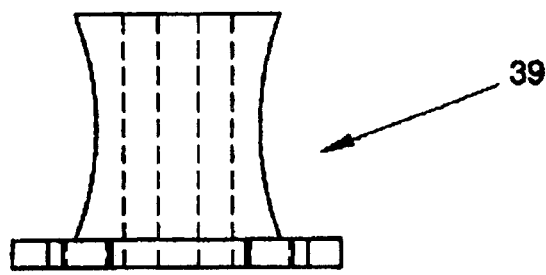
FIG. 10 is a side elevation of the spool of FIGS. 7 to 9.

Referring generally to FIGS. 3 to 6 there are shown a number of embodiments of the invention which are different in only small ways. Accordingly common components are identified with the same reference numerals. Thus a knot tying device 31 is illustrated in three slightly different versions in FIGS. 3 to 5, all in perspective view (with FIG. 5 serving also to show the path of a fishing line in which a knot is to be formed), whilst FIG. 6 show a simple plan view of a similar device (with the spool removed as in FIG. 5).

The device 31 has a support plate 32 from which extend three fingers, namely a first finger 33, second finger 34 and third finger 35. The first finger 33 is provided with notch or groove means 36 thereabouts to facilitate holding a portion of the primary line 37 (eg from a rod, as shown in FIG. 5) to keep it taught whilst utilising the device 31. Affixed to the first finger 33 is a hollow spindle arrangement 38, with a rotatable spool 39 located thereabouts, which is able to rotate about the spindle 38. Both the spindle 38 and spool 39 have a portion cut away 40 and 41 respectively, so that the line 37 (as shown in FIG. 5) can be fed into the hollow interior 42 when the cut away portions 40,41 are aligned (as illustrated in each of FIGS. 3 and 4). The spool 39 has notches 43 cut in its lower periphery 44 to allow the free end of the line 64 to be held therein as discussed below. The notches however need not be in the lower periphery as such however and may be located as required in other areas on the spool 39. The spool 39 may optionally have a facility such as a knurled region to facilitate gripping when it is manually rotated (not shown specifically). The spool 39 is also shown in more detail in FIGS. 7 to 10. It will be readily appreciated that the spool may either fit over the spigot and be rotatable thereabouts, or alternatively may fit inside a suitable recess in finger 33 as long as a lower peripheral portion 44 as described above is located below such recess (acting as in inverse spigot).

Figure 11:
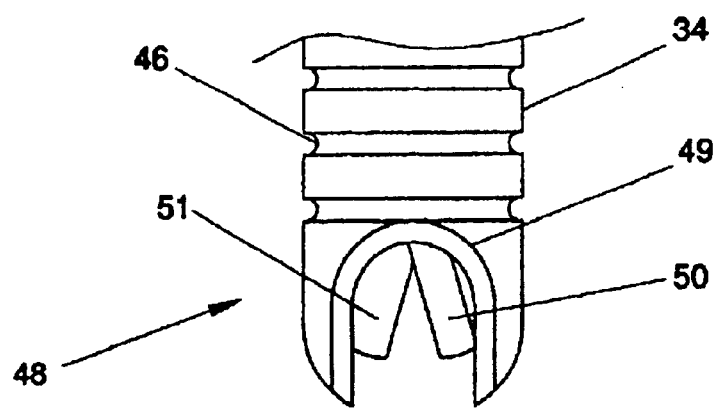
FIG. 11 is a plan view of a cutting device for use with various embodiments of the invention.
Figure 12:
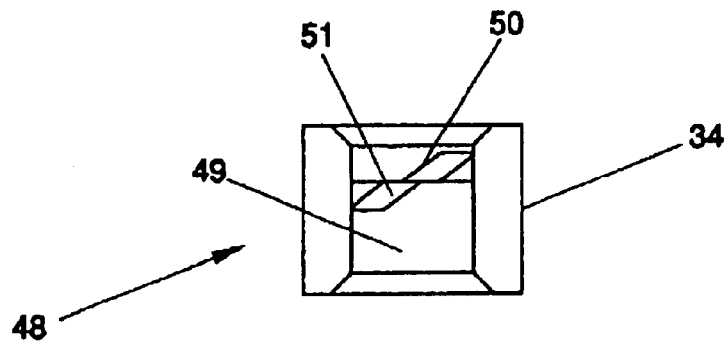
FIG. 12 is an end view of the cutting device of FIG. 11.
Figure 13:
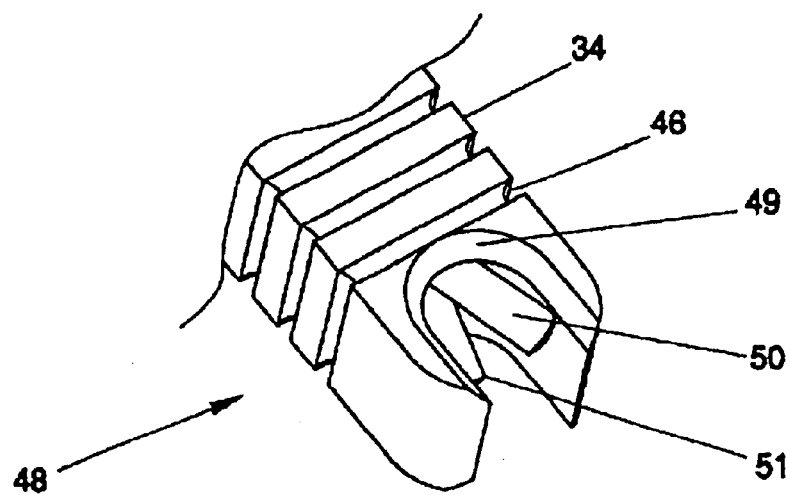
FIG. 13 is a perspective view of the cutting device of FIGS. 11 and 12.
Figure 14:
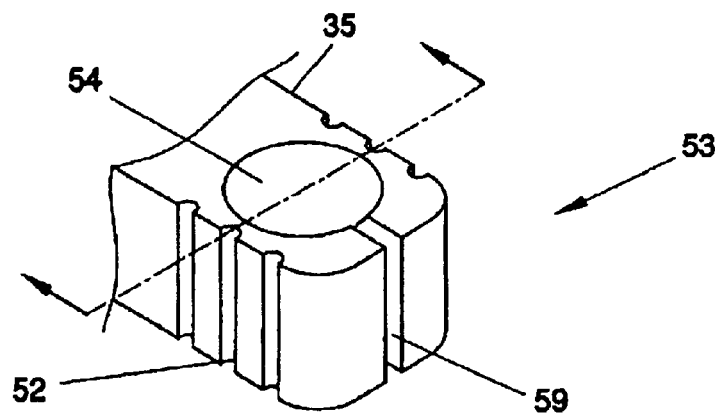
FIG. 14 is a detailed perspective view of a threading device located in the end of the third finger of the knot tying device according to one aspect of the invention.
Figures 15, 16:
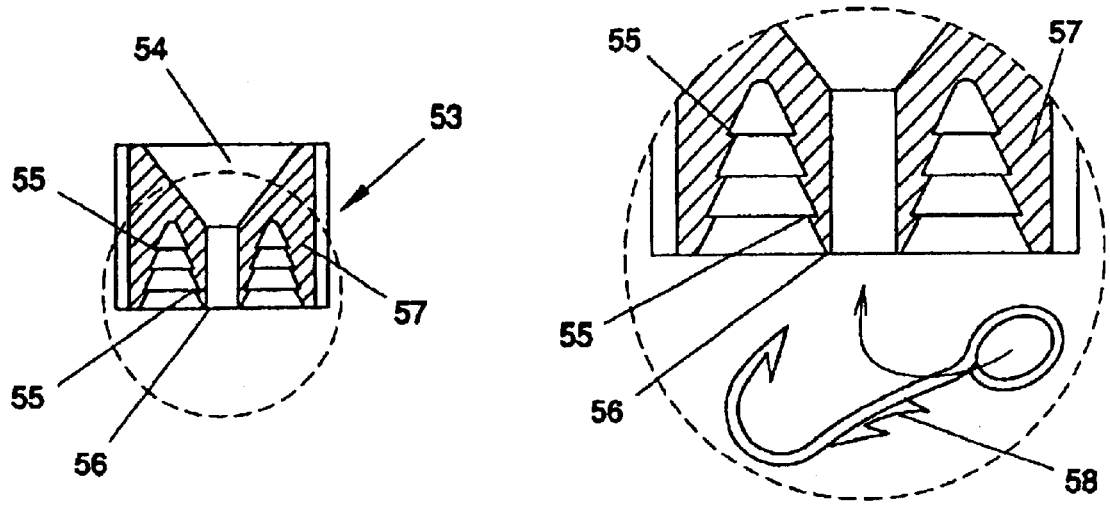
FIG. 15 is a cross-sectional view of the threading device of FIG. 15.
FIG. 16 is a detailed view in cross-section of the region in which a hook may be located to facilitate feeding a line through the eye thereof.
Figure 17:
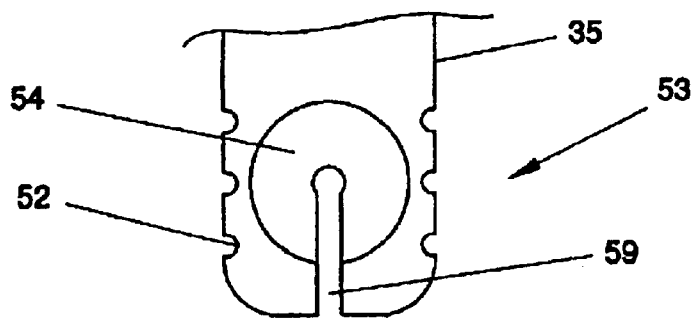
FIG. 17 is a plan view of the threading device of FIG. 14.

The second finger 34 is located intermediate the first and third fingers 33,35, but is not in a direct line therebetween, being generally offset to the side or front, particularly to the side as shown in FIG. 6. The second finger 34 is also provided with notch or groove regions 46 to prevent slippage of the fishing line wound thereabouts to form a loop 47 as shown in FIG. 5. Optionally a cutting device 48 for trimming the line may be provided in the second finger 34, the details of which are shown in FIGS. 11 to 13. A cutaway portion or recess 49 houses a pair of blade members 50,51. A fishing line (not shown) may be easily trimmed by drawing it into the recess 49 and against the blades 50,51.

The third finger 35, is again provided with notch or groove means 52 to prevent the line slipping when wound thereabouts. It will be appreciated however that the third finger may instead be suitable shaped to prevent the line fro slipping. However, the third finger is also provided with a threading device 53 the details of which are shown in FIGS. 14 to 17. The threading device 53 consists of an inverse conical chute 54 into which the fishing line can be fed. Below the chute 54 means are provided in the form of grooved or ridged portions 55 either located on a central spigot 56 or about the periphery of a lower inverse conical region 57 to hold a hook 58 in place so the line will pass through the eye of the hook, when the hook is pressed into and held in the grooved or ridged regions. A slot 59 communicating with the chute allows the line and hook to be easily removed once the knot is formed.

Figure 3:
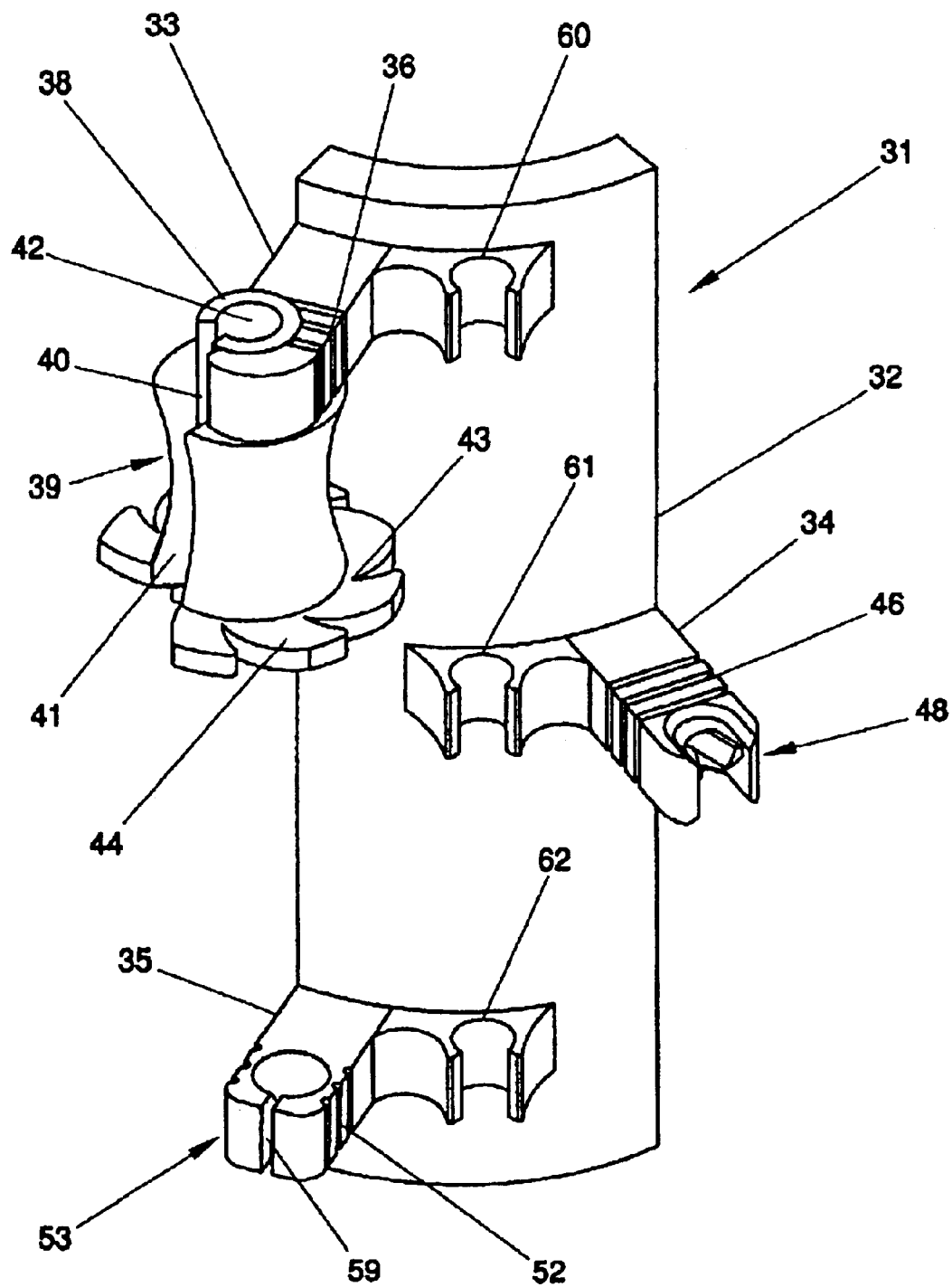
FIG. 3 is a perspective view of an embodiment of a knot tying device according to one aspect of the invention.
Figure 4:
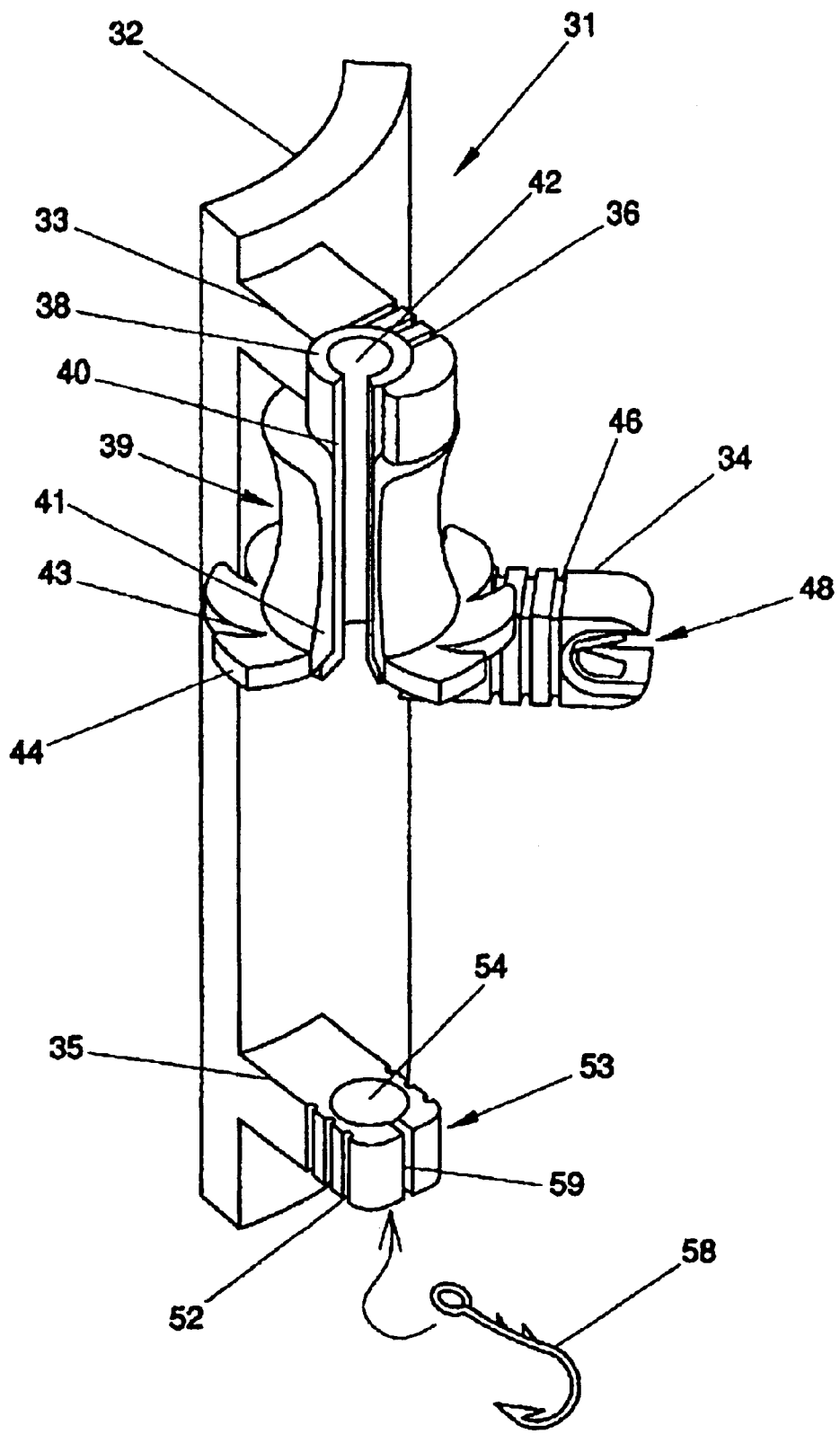
FIG. 4 is a perspective view of another embodiment of a knot tying device according to another aspect of the invention.

As shown in FIG. 3, additional clasp points 60, 61 and 62 may be provided adjacent the fingers 33,34 and 35 to allow a section of rod to be held therein.

In use, as shown especially in FIG. 5, a line 37 is drawn from a rod (not shown) and fed firstly through the centre spool and spigot combination 38,39 (although the spool is not in fact shown in FIG. 5, refer to FIGS. 3 and 4), located on the first finger 33 when they are suitably aligned. The line is then wound around or threaded through threading device 53 on the third finger 35 as required to form a return portion 63. The threading device is used when a hook 58 is required to be tied to the line. The hook will be held in place as shown diagrammatically in FIG. 16 and the line fed through the conical chute 54 and thus through the eye of the hook.

The return portion of the line 63 is then brought up through the centre of the spool and spigot combination 38, 39, whereupon it is then passed around the second finger 34 forming a loop 47. The free end of the line 45 is then affixed in one of the notches 43 in the periphery 44 of the spool 39 (not shown in FIG. 5). The spool 39 is then turned five or six times as required to form the knot, at which point, the tension in the line is released, the formed knot slid off the device 31 and the ends pulled tight to compact the turns, moving the thus formed knot down to the eye of the hook. The free end 64 may be trimmed as required using the cutting device 48.

Figure 18:
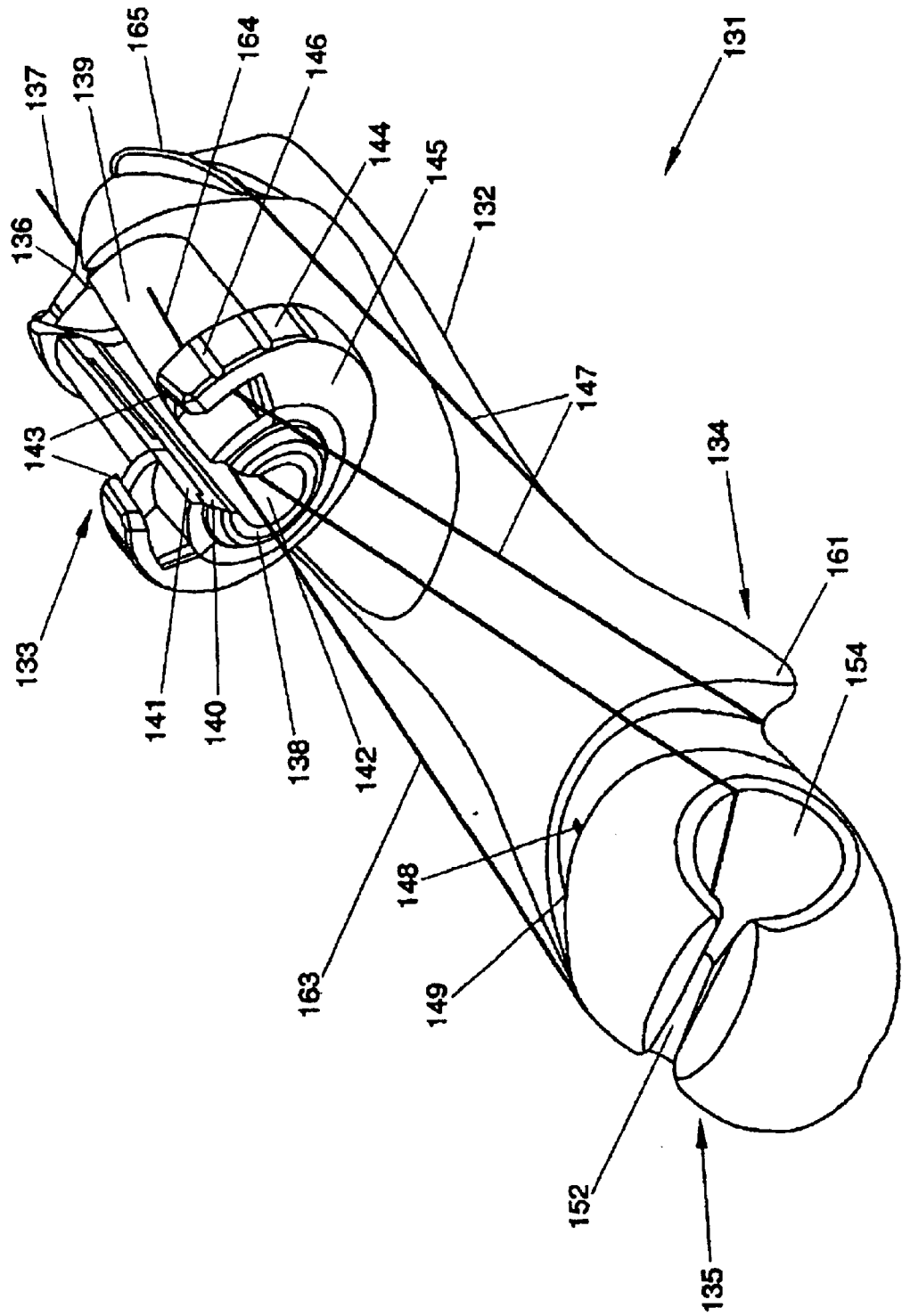
FIG. 18 is a perspective view of a further embodiment of the invention employing nodes rather than fingers.
Figure 21:
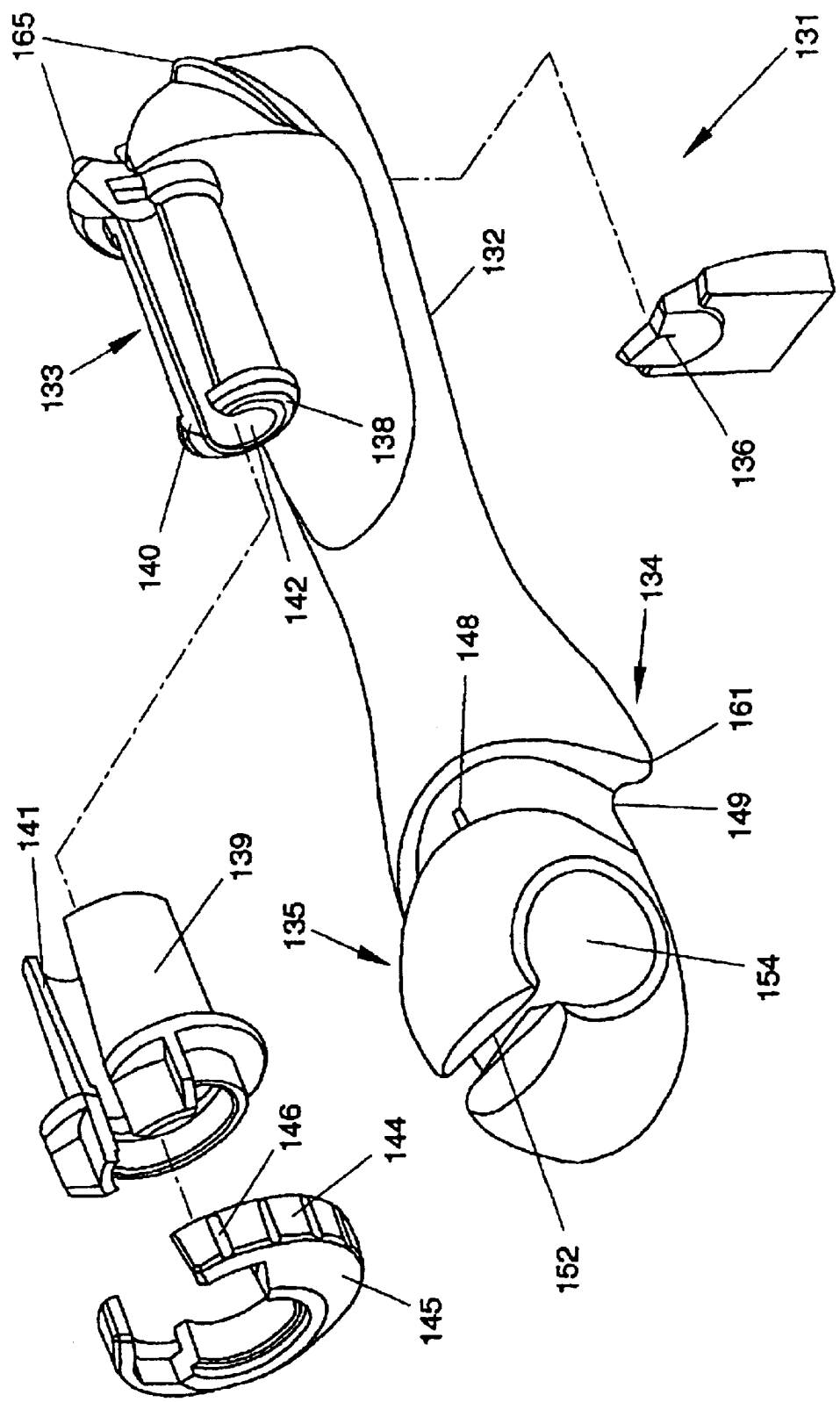
FIG. 21 is an exploded perspective view of the components comprising the device of FIG. 18.
Figure 22:
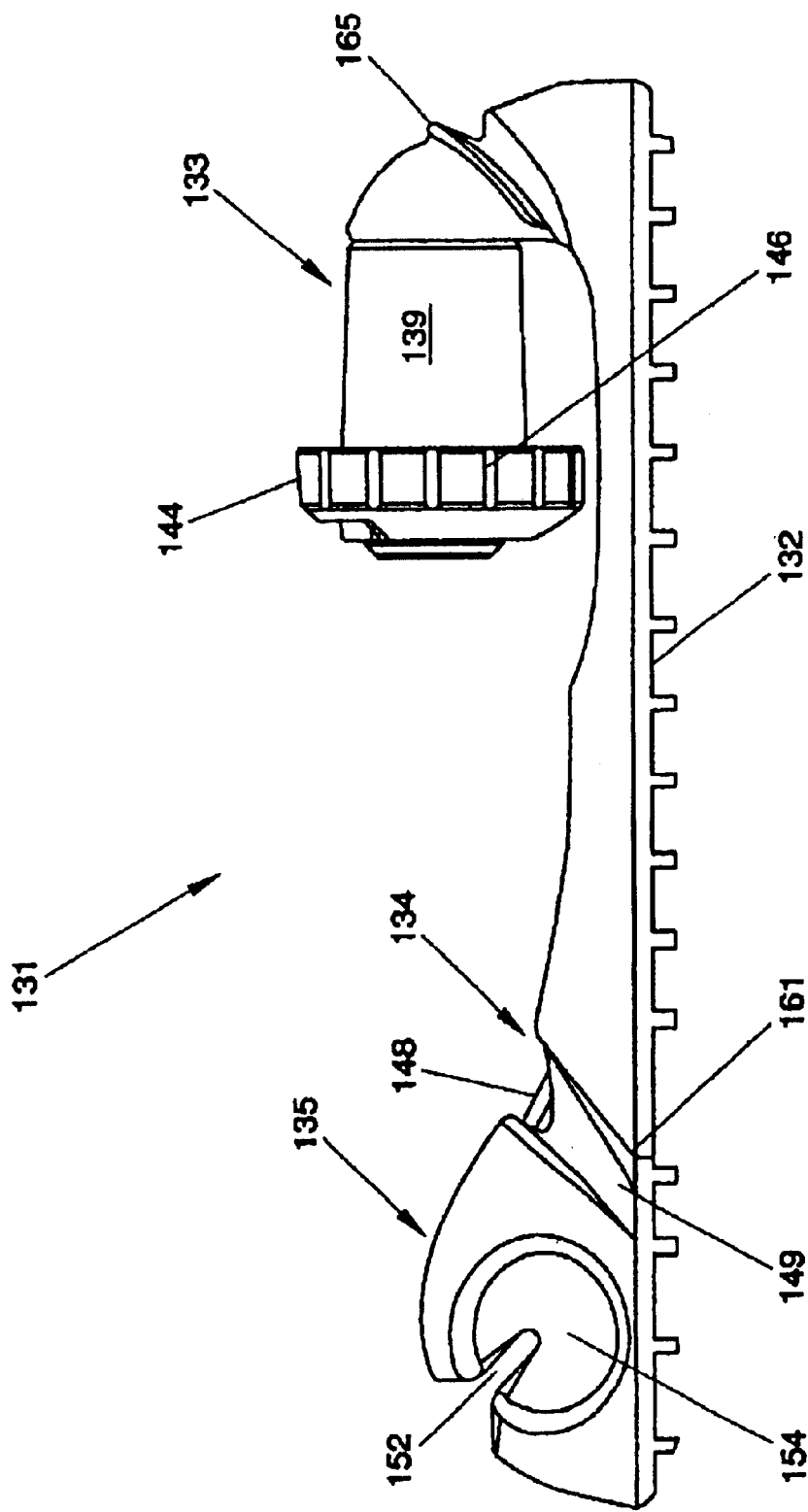
FIG. 22 is a side elevation of the device of FIG. 18.

Turning to FIGS. 18 to 24, there is depicted an alternate embodiment of the invention in which the fingers of the previously described embodiments shown in the earlier Figures are replaced by nodes which function in essentially the same way. In this case, a knot tying device 131 is illustrated which has a support plate 132 from which extend three node regions, namely a first node region 133, second node region 134 and third node region 135. The first node region 133 is provided with notch or groove means 136 to facilitate holding a portion of the primary line 137 (e.g. from a rod not illustrated on which the device 131 may be mounted) to keep it taught whilst utilising the device 131. Affixed within the node region 133 is a hollow spindle arrangement 138, with a rotatable spool 139 located thereabouts, which is able to rotate about the spindle 138. Both the spindle 138 and spool 139 have a portion cut away, namely 140 and 141 respectively, so that the line 137 (as shown in FIG. 18) can be fed into the hollow interior 142 when the cut away portions 140,141 are aligned. The spool 139 has one or more notches 143 cut or formed in its lower periphery 144 to allow the free end of the line 164 to be held therein when the spool 139 is turned as discussed below. In this particular case the notch 143 is conveniently formed at the junction of the outer gripping ring 145 and the spool proper 139, the individual components being readily identified in FIG. 21. The notch 143 however need not be in the lower periphery as such however and may be located as required in other areas on the spool 139. The spool 139 may optionally have a facility such as a knurled region 147 to facilitate gripping when it is manually rotated. The spool 139 is analogous to that shown above in the previously described embodiments where more detail is provided for example in FIGS. 7 to 10. It will also be apparent that the design of the spool 139 and node region 133 is such that it will function when used in either right handed or left handed mode, the choice of notch 143 located on the right or left of the cut away portions 140,141 following only as a consequence of whether right or left handed operation is in fact chosen. The node region is also provided with wing elements 165 to assist in winding the line about the device 131 as discussed below.

The second node region 134 is located intermediate the first and third node regions 133,135, and is provided with a pair of flange like elements 161, the choice of which is again determined by whether the device 131 is used in right handed or left handed mode. In any event, neither of the flange like elements 161 is in line with an axis formed between the cutaway portions, 140,141 and the entry point where the primary line 137 meets the third node region 135. The flange like elements 161, or the second node region 134 in general 134 may also be optionally provided with notch or groove regions, not specifically shown to prevent slippage of the fishing line wound thereabouts to form a loop 147 as shown in FIG. 18. Optionally a cutting device in the form of a blade 148 for trimming the line may be provided in the second node region 134. A cutaway portion or recess 149 houses the blade member 148. A fishing line (not specifically shown) may be easily trimmed by drawing it across the recess 149 and against the blade 150.

The third node region 135, is provided with an open notch or groove means 152 to prevent the line slipping when wound thereabouts. In the embodiment illustrated, the notch or groove means 152 doubles as a threading device. The threading device 152 consists of a pair of opposite inverse conical chutes 154 into which the fishing line can be fed. Again the choice of which merely follows from whether the device is used in right hand or left hand mode. The chute 154 allows the eye of a hook etc to be held against the actual notch 152 communicating between the chute portions, so that the line will pass through the eye of the hook, when the hook is thus pressed into and held therein, analogous to the way in which the earlier embodiments are described above. The open notch 152 allows the line and hook to be easily removed once the knot is formed.

In use, as shown in FIG. 18, a line 137 is drawn from a rod (not shown) and fed firstly through the centre spool and spigot combination 138,139, located on the first node region 133, when they are suitably aligned. The line is then passed through notch/threading device 152 located on the third node region 135 as required to form a return portion 163. The threading device 152 is itself used when a hook not shown is required to be tied to the line.

The return portion of the line 163 is then brought up through the centre of the spool and spigot combination 138, 139, whereupon it is then passed under the wing element 165 of the first node region 133 and passed around one or other of the flange like elements 161 defining the second node region 134, thereby forming a loop 147 thereabouts. The free end of the line 145 is then affixed in one of the notches 143 in the periphery 144 of the spool 139. The spool 139 is then turned five or six times as required to form the knot, at which point, the tension in the line is released, the formed knot slid off the device 131 and the ends pulled tight to compact the turns, moving the thus formed knot down to the eye of the hook. The free end 164 may be trimmed as required using the cutting device 148.

Throughout the specification the word "complies" and its derivatives are intended to have an inclusive meaning rather than an exclusive meaning unless the context requires otherwise.

The invention has industrial applicability at least in relation to the provision of devices for tying knots in fishing lines and the like.

The foregoing describes only some embodiments of the present invention, and modifications obvious to those skilled in the art can be made thereto without departing from the scope of the present invention.

I claim:

1. A device for forming a knot in a fishing line or the like in order to attach a fish hook or other item of fishing tackle thereto or to join the line to another line, comprising a support means with three fingers or other suitable nodes extending therefrom in spaced relationship, so that the middle or second finger or node is offset from a line joining the first and third fingers or nodes, each finger or node having means associated therewith which cooperate to allow the tying of a hangman's knot or uni-knot as defined herein, the first finger or node having means to retain and rotate the free end of the line after it has passed around the other two fingers or nodes so as to be able to twist the free end of the line about both a first primary portion of the line and a second return portion of the line to form the knot, the third finger or node allowing a loop to be formed in the primary line to create the said return portion, and the second finger or node allowing a loop to be formed in the line intermediate the return portion and the free end of the line, the second finger or node keeping said loop thus formed away from or clear of the twisting operation performed by the rotation means twisting the free end about the primary and return portions of line running between the first and third fingers or nodes.

2. A device according to claim 1, wherein the support means is in the form of a plate or wire member which is removably attachable to a suitable portion of a fishing rod, by means including clasp mounting, snap-on fitting, taping, wrapping, utilising Velcro™ fitting or tying.

3. A device according to claim 1, wherein the support means is in the form of a plate or wire member which is permanently attached to a suitable portion of a fishing rod, by means of gluing, riveting or fixing with screws.

4. A device according to claim 1, which is hand held.

5. A device according to any one of the preceding claims wherein each of the three fingers or nodes is integrally formed with the support means.

6. A device according to claim 5, in which the support means and fingers or nodes are formed from a continuous length of heavy gauge wire material bent to form the basic structure, namely the support means and respective fingers or nodes, the means associated with each finger for forming the knot being affixed to the respective fingers or nodes thus formed.

7. A device according to any one of the preceding claims, in which one or more of the three fingers or nodes has grooves or serrations along a portion thereof or is otherwise so shaped as to prevent slippage of the fishing line therefrom when the device is being used to form the knot.

8. A device according to any one of the preceding claims in which the first finger or node has means associated therewith to retain the fishing line whilst forming the knot, so that the line is kept under suitable tension as it is fed through or around the various fingers or nodes and/or the components found thereon.

9. A device according to any one of the preceding claims, in which the means to rotate the free end of the line about the primary and return portions of the line is provided in the form of a rotatable spool arrangement having a central hollow core, the spool having a slot along the side thereof communicating with the hollow core to allow the primary and return portions of the line to be fed or threaded into the hollow core.

10. A device according to claim 9, in which the spool is located on and rotatable about a spindle arrangement, the spindle itself also having a corresponding hollow core and having a similar slot along its length, whereby in a first feeding position, the slots in the spool and spindle are brought into alignment and the primary and return portions of the fishing line are fed through both slots and thus into the central core, so that the primary and return portions of the fishing line are retained in position, whilst the spool is twisted thereabouts, thereby causing the free end of the line to be wound the necessary number of turns about the primary and return portions of the line.

11. A device according to claim 9, wherein the outer profile of the spool is serrated, textured or shaped to allow the user to run a finger along the outer edge thereof to turn it as required.

12. A device according to claim 9, in which a raised section or flange, on the outer edge of the spindle mates with a notch in the spool so as to correctly aligning the twisting spool, in order that the line may be readily inserted & released from the spool/spindle combination.

13. A device according to claim 9 in which a lip or radially extending flange is located around the lower edge of the spindle, to hold the spool in place.

14. A device according to claim 9, wherein the means to retain the free end of the line in or on the spool, is preferably provided for example in the form of a simple cut in the periphery thereof analogous to the cut provided in a reel of sewing thread, into which the line can be wedged, so that the free end of the line will be retained therein and be caused to wind about the primary and return portions of the line passing through the centre of the spool/spindle combination, when the spool is turned about its axis.

15. A device according to claim 1, in which the third finger or node also has a hook threading means associated therewith for retaining a hook, especially the eye thereof, in position in order to allow for threading of the line therethrough.

16. A device according to claim 15 in which the third finger or node is provided with a threader in the form of a slot, comprising a funnel shaped entry point or countersunk holes communicating with a corresponding recess into which the eye of a hook is located, so that during a threading operation, the fishing line is pushed into the funnel shaped entry point and thereby caused to be threaded through the eye of the hook during the operation of forming the knot, whilst the slot itself has a suitable slit therein which allows removal of the line and hook once the knot is formed.

17. A device according to claim 16, in which one of the counter sunk holes in the threader contains curved shaped alignment grooves or notches that allow a hook to be held in place for threading.

18. A device according to claim 1, in which the device also incorporates a line cutter, located in a suitable safe position, whereby the line and especially the free end of the line, may be trimmed, once the knot is formed.

19. A device according to claim 18, wherein the cutter is mounted on the second finger or node or in that vicinity, within a recessed groove.

20. A device according to claim 1, in which the device also incorporates not only means by which it can be attached to a single rod, but by suitable adaptation additional means so that it doubles as a device to retain sections of rod when disassembled.

21. A device according to claim 1, in which the finger or nodes are arranged symmetrically, whereby the device can function either in right-handed or left handed mode.

22. A method of forming a hangman's knot or uni-knot as defined herein, utilising a device according to claim 1, including the steps of:
  a) threading a fishing line through a retaining means associated with the first finger or node to maintain tension in the line whilst tying the knot,
  b) feeding line through the hollow core of a spool and spindle combination mounted on the first finger or node of said device, then
  c) passing the line through a threading means located in a third finger or node located below the first finger or node, a hook having been located therein, so that the line is threaded through the eye thereof, or simply around the outside of the third finger or node if threading is not required,
  d) feeding the line back through the hollow core of the spool and spindle combination mounted on the first finger or node to form a return portion of the line, then
  e) winding the free end of line about a second finger or node intermediate the first and third fingers or nodes, the second finger or node being offset from a line drawn between the first and third fingers or nodes to ensure that the loop thus formed is kept clear of the turning device and the primary and return portions of line extending between the first and third fingers or nodes,
  f) attaching the free end of the line to the spindle by suitable attachment means,
  g) causing the spindle to be rotated a sufficient number of turns (eg five or six turns) as required to form the knot, ie winding the free end of the line that many turns about the primary and return portions of the line, then
  h) slipping the formed knot off the device and pulling on the respective portions of the line (ie the primary portion and the free end) to compact the knot, and then
  i) sliding the knot towards the eye of the hook to complete the operation.

\* \* \* \* \*